(12) United States Patent
Galovski et al.

(10) Patent No.: US 11,206,852 B2
(45) Date of Patent: Dec. 28, 2021

(54) COMPACT NUTRIENT DENSE FREEZE-DRIED PET FOOD PRODUCT

(71) Applicant: Guardian Pet Food Company, Needham, MA (US)

(72) Inventors: James Galovski, Needham, MA (US); Ryan Yamka, Trumbull, CT (US)

(73) Assignee: Guardian Pet Food Company, Needham, MA (US)

( * ) Notice: Subject to any disclaimer, the term of this patent is extended or adjusted under 35 U.S.C. 154(b) by 0 days.

(21) Appl. No.: 15/858,642

(22) Filed: Dec. 29, 2017

(65) Prior Publication Data

US 2019/0208801 A1 Jul. 11, 2019

Related U.S. Application Data

(60) Provisional application No. 62/550,051, filed on Aug. 25, 2017.

(51) Int. Cl.
| | |
|---|---|
| *A23K 50/42* | (2016.01) |
| *A23K 10/20* | (2016.01) |
| *A23K 50/40* | (2016.01) |
| *A23K 10/26* | (2016.01) |
| *A23K 20/158* | (2016.01) |
| *A23K 20/147* | (2016.01) |
| *A23K 20/174* | (2016.01) |
| *A23K 30/00* | (2016.01) |
| *A23K 40/20* | (2016.01) |
| *A23K 10/18* | (2016.01) |
| *A23K 10/35* | (2016.01) |

(52) U.S. Cl.
CPC .............. *A23K 50/42* (2016.05); *A23K 10/18* (2016.05); *A23K 10/20* (2016.05); *A23K 10/26* (2016.05); *A23K 10/35* (2016.05); *A23K 20/147* (2016.05); *A23K 20/158* (2016.05); *A23K 20/174* (2016.05); *A23K 30/00* (2016.05); *A23K 40/20* (2016.05); *A23K 50/40* (2016.05)

(58) Field of Classification Search
CPC ........ A23K 10/20; A23K 50/42; A23K 50/40; A23K 10/26; A23K 10/35; A23K 20/147; A23K 40/20; A23K 10/18; A23K 50/10; A23K 20/174; A23K 20/158; A23K 30/00
USPC ........................................................ 426/641
See application file for complete search history.

(56) References Cited

U.S. PATENT DOCUMENTS

| | | | | |
|---|---|---|---|---|
| 3,385,715 | A * | 5/1968 | Ishler ...................... | A23P 30/10 426/274 |
| 3,600,189 | A * | 8/1971 | Raynal ................... | A23K 50/15 426/69 |
| H70 | H | 6/1986 | Berkowitz et al. | |
| 5,087,473 | A * | 2/1992 | Leo .......... | A23K 50/42 426/385 |
| 5,612,074 | A | 3/1997 | Leach | |
| 2002/0119181 | A1* | 8/2002 | Muszynska .......... | A61K 31/355 424/439 |
| 2005/0181097 | A1 | 8/2005 | Townsend | |
| 2005/0208104 | A1* | 9/2005 | Gross ........................ | A61P 3/00 424/442 |
| 2008/0069931 | A1* | 3/2008 | Vijayalakshmi ........ | A23L 21/12 426/534 |
| 2008/0138464 | A1 | 6/2008 | Townsend | |
| 2010/0028483 | A1 | 2/2010 | Wasserfuhr | |
| 2010/0086619 | A1* | 4/2010 | Willis ....................... | A61P 3/02 424/602 |
| 2013/0344010 | A1* | 12/2013 | Pompejus .............. | A23K 10/16 424/50 |
| 2014/0335228 | A1 | 11/2014 | Guerrero | |
| 2016/0128367 | A1 | 5/2016 | Huntsman | |

FOREIGN PATENT DOCUMENTS

WO 2014/098193 A1 6/2016

OTHER PUBLICATIONS

Hadshell et al. (in J Dairy Sci. 71: 762-772, 1988) (Year: 1988).*
Notification of Transmittal of the International Search Report and the Written Opinion of the International Searching Authority, or the Declaration, in PCT Application No. PCT/US2018/047854, dated Oct. 22, 2018.
Supplementary European Search Report in EP 18847917 dated Dec. 23, 2020.
Fabio Ritter Marx, Luciano Trevizan, Oystein Ahlstrom, and Alexandre de Mello, Soybean Oil and Beef Tallow in Dry Extruded Diets for Adult Dogs, Archives of Animal Nutrition (2015), vol. 69, No. 4 https://doi.org/10.1080/1745039X.2015.1058619.

* cited by examiner

*Primary Examiner* — Erik Kashnikow

(74) *Attorney, Agent, or Firm* — White and Williams LLP

(57) ABSTRACT

A freeze-dried pet food meal bar that is 100% nutritionally complete consisting of more than 30% crude protein, 35% crude fat, less than 20% carbohydrate and less than 10% moisture. The product will consist primarily of animal protein. Vitamins and mineral will be supplied via fruits and vegetables. Since the product is freeze dried the product will be semi-fractural and can be broken into smaller pieces for feeding. Each bar will be approximately 5 to 6 inches long, 2 to 3 inches wide, approximately ½ inches thick and weigh 2 to 3 ounces. A single bar will be targeted to feed a 40 pound dog. Dogs below 40 pounds would feed less than one bar (ex. 20 pound dog gets ½ bar). Dogs above 40 pounds would feed more than one bar (ex. 80 pound dog gets 2 bars).

17 Claims, No Drawings

COMPACT NUTRIENT DENSE FREEZE-DRIED PET FOOD PRODUCT

BACKGROUND OF THE INVENTION

The pet care industry in 2016 reached $66.75 Bn with Pet Food accounting for 42.3% of total sales ($28.23 Bn). Mars, Nestle and Big Heart Brands collectively make up more than 52% of US Pet Food sales. Secondary players over $1 Bn in revenue include Colgate, Diamond, BLUE Buffalo. Newer entrants into the category range from celebrity endorsed products (Rachel Ray and Halo by Ellen Degeneres) to protein heavy based alternatives (Orijen, Nulo, Nature's Variety, Stella and Chewy's). Even established brands and companies are stepping into the fray with reformulations, new offerings and acquisitions (e.g. Zuke's, Castor & Pollox and Merrick's; all now owned by Nestle Purina).

Amongst the newest trends in the category are freeze-dried, dehydrated, "baked" kibble and hybrid formulations. All forms are marketed as less processed and more nutrient rich than the traditional extruded process. The concepts of raw food, biologically appropriate and ancestral diets continue to grow, albeit slowly due to bacterial/pathogen concerns.

The freeze-dried segment is relatively new with respect to the pet care industry and the number of competitors has increased over the last few years. The biggest company in the segment is Stella & Chewy's which launched freeze-dried meals in 2006. They have a "first to market" following as well as a large brand presence online (e.g. Chewy.com and Amazon.com). Other major brands in freeze-dried are Orijen (Champion Pet Foods), Merrick (owned by Nestle Purina) and Fromm's. Mid-Major brands include The Honest Kitchen, Nature's Variety, Primal and Sojos. The brands focus on freeze dried foods (similar to oatmeal or patties) which require rehydration prior to feeding to the animal.

Additionally, very few brands produce a completely freeze-dried product. In an effort to lower costs and expand their user base (often driven by their holding company), they combine extruded pet food and add freeze-dried (FD) kibble. The newest trend is to produce "baked kibble" and add FD pieces or kibble coated in a raw palatant. This is an effort to attract consumers that are against "industrial/big company" pet food (i.e., extruded pet food) but are unwilling to pay the full freeze-dried meal pricing.

Most modern processed foods contain preservatives to reduce bacterial growth and artificially supplement flavor. Modern preservatives rely on high salt content and ingredients you don't want to read are in your food: calcium propanoate, ethylenediaminetetraacetic acid, methylchloroisothiazolinone and sodium nitrite to name a few. Although increasing the shelf life of the products they are added to, these artificial ingredients (a) grant foods a shorter shelf-life than freeze-drying and (b) have provoked a debate amongst nutritionists and toxicologists as to their negative health effects. Because the progress of enzymes and microorganisms in preservative-added foods is only slowed and not stopped (unlike in freeze dried foods, freeze-dried foods have longer shelf lives than foods preserved with artificial additives.

Freeze-dried foods that are sealed against moisture can be stored at room temperature without refrigeration and remain viable almost indefinitely. The freeze-drying process causes no noticeable damage to foods, preserving their flavor, texture, size and shape. Freeze drying produces products with a longer shelf life than any other preservation method, without harmful additives or changing the food's structure and texture. Freeze-dried foods taste fresh, smell fresh, look fresh and stay fresh longer than any other food. Freeze drying sublimates the moisture in food with no additives or gasses by using high pressures and temperatures. The food's shape, texture, flavor and quality are retained with equivalent or superior shelf life when compared with dehydration. Since over 50% of the weight of food is water, freeze-dried foods weigh less than half that of other food using a different preservation method. This means a light-weight product and lower shipping costs.

Several companies offering freeze dried meals have "matured" and are currently in a customer acquisition mode (ex Sojos acquired by Wellpet). They are attempting to broaden their base by lowering landed cost. This results in efforts to find both lower ingredient costs and efficiency gains in production (greater yields). Many companies selling freeze dried products use lesser quality ingredients and combine other dry ingredients to improve yield and lower overall costs. Nature's Variety and Primal for example uses montmorillionite clay (flow agent/processing aid) while others use various grains, sodium phosphate monobasic, lecithin and/or sugar.

Given the current landscape in the marketplace, we believe there is an unmet need for consumers to have a high-quality meal bar without any of the negatively perceived ingredients. Currently methods of feeding pets (as exemplified above) are generally bulky and inconvenient. A meal bar would allow people to travel with their pets and have a simple way of feeding their animals while they are on the go (camping, hiking, shopping, etc.). Alternatively, individuals that do not want to store tons of cans/kibble would have a rational and convenient alternative. Additionally, persons that are simply worried about overfeeding with the vague guidelines that are on most packaging to date would have a way of more precisely and conveniently feed their pets.

SUMMARY OF THE INVENTION

The invention comprises a freeze-dried pet food meal bar consisting of more than 30% crude protein, 35% crude fat, less than 20% carbohydrate and less than 10% moisture. In one aspect, the invention the meal is 100% nutritionally complete. In another aspect, the meal bar of the invention consists primarily of animal protein. In a preferred embodiment, the bar is shelf stable. In a more preferred embodiment the meal bar of the invention contains no artificial ingredients. In a further aspect, the nutritional bar of the invention contains no processing aids, no heat stable sources of vitamins and/or no over supplementation of vitamins or fats.

In one aspect, the nutritional bar of the invention is nutritionally complete food bar. In one embodiment the nutritional bar is freeze-dried. In a preferred embodiment, the freeze dried food bar is nutritionally complete for a 40 lb. animal—preferably a dog. In a more preferred embodiment the nutrition bars of the invention are between 2-3 ounces, and approximately 5 to 6 inches long and are semi-fractural. In a further preferred embodiment, the food bars of the invention consists essential of the following ingredients (on a percentage basis by weight): Beef—47.08%; Beef Liver—34.72%; Sweet Potato—5.00%; Chickpeas—5.00%; Flaxseed—3.00%; Coconut Oil—2.50%; Bone Meal—2.00%; Sea Salt—0.40%; Vitamin/Mineral Mix—0.20; and Tocopherols—0.10%.

In yet a further embodiment, the food bars of the invention consist essentially of the following ingredients (on a percentage basis by weight): Turkey—47.1%; Duck—19.7%; Turkey Liver—17.0%; Chickpeas—5.0%; Sweet Potato—4.1%; Flaxseed—3.0%; Coconut Oil-2.5%; Bone Meal—0.9%; Salt—0.4%; Vitamin/Mineral Mix—0.2%; and Tocopherols—0.1%.

In further embodiments the food bars of the invention consist essentially of the ingredients set forth in Tables 3, 4 and 5 herein. In certain aspects of the invention components may be included to promote digestive health including pumpkin, chicory root and probiotics such as probiotic bacteria.

In another aspect the invention comprises a method of manufacturing an all-natural, nutritionally complete food bar, wherein the components are formed into a mixture, the mixture is pressed into bars and the bars are freeze dried. In a further aspect, the method of manufacture produces food bars between 2-3 ounces, approximately 5 to 6 inches long and approximately 2 to 3 inches wide. In a further aspect, the bar is produced without the use of flow agents or antimicrobial agents.

In a further aspect, the invention comprises a method of providing complete daily nutrition to an animal by providing to the animal the nutritional bar in claim 1 wherein the nutritional dosage is titrated based on the weight of the animal. In a preferred embodiment the method comprises administering a single bar to a 40 Lb. animal. In a most preferred embodiment the animal is a dog.

DETAILED DESCRIPTION OF THE INVENTION

We have created and designed a freeze-dried pet food meal bar that is 100% nutritionally complete consisting of more than 30% crude protein, 35% crude fat, less than 20% carbohydrate and less than 10% moisture. The product consists primarily of animal protein (>70%). The remainder of the bar (<30%) consists of components to make the bar 100% nutritionally complete. This includes and is not limited to ingredients such as sea salt, bone meal, sweet potato, chickpeas, flaxseed, coconut oil, fruits, vegetables and mixed tocopherols. For those skilled in the art other ingredients can be used to supply or complement the animal protein to ensure a 100% complete and balanced bar is produced. Additionally, animal protein sources may include and are not limited to the following: beef, chicken, fish, alligator, rabbit, turkey, duck, game birds, venison, bison and elk.

Vitamins and mineral will be supplied via fruits and vegetables. Since the product is freeze dried the product will be semi-fractural and can be broken into smaller pieces for feeding. Each bar will be approximately 5 to 6 inches long, 2 to 3 inches wide, approximately ½ inches thick and weigh 2 to 3 ounces. A single bar will be targeted to feed a 40 pound dog. Dogs below 40 pounds would feed less than one bar (ex. 20 pound dog gets ½ bar). Dogs above 40 pounds would feed more than one bar (ex. 80 pound dog gets 2 bars).

Nutritionally Complete is defined by Association of American Feed Control Officials 2017 Official Publication page 142 when the product meets the nutrient requirements for a particular life stage as established by an AAFCO recognized nutrient profile (p152 to 166; AAFCO 2017) or completion of an AAFCO-recognized feeding protocol.

The nutritional bar of the invention is both compact and nutrient dense. The inventors have achieved a nutritional bar with a high caloric density. Specifically, the nutrition bar of the invention has a caloric density of greater than 5000 kcal/kg. In a preferred embodiment the bar has a caloric density of greater than 5500 kcal/kg. The nutrition bar of the invention can be produced with a density of 6300 kcal/kg or greater which is anywhere from 66% to 90% greater than extruded kibble based food.

Since the bar is freeze dried, the ingredients do not require any processing aids (ex. flow agents, antimicrobial agents (i.e. lactic acid or phosphoric acid) or heat stable sources of vitamins/minerals (ex. L-Ascorbyl-2-Polyphosphate (Vitamin C) or over supplementation of vitamins/fats to ensure recovery at the end of thermal processing (>160° F.).

Freeze drying can be accomplished using any one of the standard freeze drying techniques used for food and food related products. Mixed ingredients are first frozen and then put in a high-pressure state. This does not create ice crystals that can damage cell walls and delicate molecules, destroying food texture and valuable nutrients ("freezer burn"). Instead, the high-pressure solid water is then sublimated: converted directly from a solid to a gas—and removed from the food. This unique process has several advantages: All moisture is completely removed from the food, stopping all enzymatic action and bacterial growth. The food's structure, texture, and nutritional content are wholly retained. It is now less than half the weight, easy to ship or store, with a shelf life that other preservation methods cannot compare to.

The meal bars of the invention were produced using a modified freeze-drying process. The food is first checked for contamination and purity. Fruits, meats, and some other edibles are tested for bacterial counts and spoilage. Much of the work of the plant is dependent on the harvest season for each food. The food pieces are spread out on flat, metal trays which are stacked 20 to 30 high in slots in a wheeled cart. With food that has been pre-cooked and frozen, the trays are pre-chilled to prevent partial thawing during handling. The carts are wheeled into a large, walk-in coldroom where the temperature can be as low as −40° F. (−40° C.). In this extremely cold temperature, the food is quickly frozen and the carts are kept in a coldroom until it is time to move them into the drying chamber.

The carts are wheeled out of the coldroom and into a vacuum drying chamber. The drying chamber is a large, long, horizontal cylinder with semi-elliptical ends. One end is hinged to open and close. When the trays of frozen food pieces are inside, the chamber is closed and sealed.

The drying procedure involves a process known as sublimation. In sublimation, a solid material is forced to change state into a gaseous material without ever becoming a liquid. In the case of freeze-dried food, the solid ice crystals trapped in the frozen food pieces are forced to change into water vapor without ever becoming liquid water. In the drying chamber, this is accomplished by evacuating the air with a vacuum pump to reduce the pressure to about 0.036 psi (0.0025 bar). The temperature of the food is raised to about 100° F. (38° C.) by direct conduction through the bottom of the trays, radiation from heat lamps, or microwave heating. When the chamber is evacuated of air, the pressure is below the threshold at which water can simultaneously exist in a solid, liquid, and gaseous (vapor) state. This threshold is known as the triple point of water. Once the pressure falls below this point, the heat causes the ice crystals trapped in the frozen pieces of food to change directly to water vapor. The vapor is drawn off and condensed within the chamber leaving the food behind. The dried food is filled with tiny voids, like a sponge, where the ice crystals were once present. Not only does this make it easier for the food to reabsorb water when it is prepared for consumption, but the dried food retains its original size and shape. The time for this drying process varies. Semi-solids and solids may take 12 hours or more. The dried food pieces are removed from the drying chamber and tested for moisture content and purity.

Freeze-dried foods must be sealed in airtight containers to prevent them from absorbing moisture from the air. Food has an inert gas like nitrogen injected into the container before sealing to displace the oxygen in the air to prevent oxidation or spoiling of the food. The packaging is done in the freeze-dry plant almost as soon as the foods come out of the drying chamber. The plant can form, fill, and seal the packages to the desired weight for the end user. Packages that are to be sold directly to the consumer are packed in cartons, stacked on pallets, and transported to the warehouse.

Each bar is approximately 5 to 6 inches long, 2 to 3 inches wide, approximately ½ inches thick and weigh 2 to 3 ounces. A single bar will be targeted to feed a 40 pound dog.

By way of example a bar was produced using the formula of Table 1 below:

TABLE 1

Formula Example (Beef Only):

| Ingredients | Inclusion, % |
|---|---|
| Beef | 47.08 |
| Beef Liver | 34.72 |
| Sweet Potato | 5.00 |
| Chickpeas | 5.00 |
| Flaxseed | 3.00 |
| Coconut Oil | 2.50 |
| Bone Meal | 2.00 |
| Sea Salt | 0.40 |
| Vit/Min Mix* | 0.20 |
| Tocopherols∓ | 0.10 |

*Proprietary Vegetable & Fruit Blend
∓Natural Antioxidant

The resulting bar was analyzed by a third-party laboratory and the following values were determined for the relevant nutritional (TABLE 2):

TABLE 2

Analyzed Values ($3^{rd}$ Party Laboratory):

| Nutrient | Value |
|---|---|
| Moisture | 3.99% |
| Crude Protein | 34.9% |
| Crude Fat | 38.1% |
| Crude Fiber | 2.88% |
| Ash | 4.13% |
| Carbohydrate* | 16.0% |

*Calculated as Nitrogen Free Extract (NFE)
NFE = (100 − moisture − crude protein − crude fat − crude fiber − ash)

The resulting bar was tested for digestibility by a $3^{rd}$ party animal testing facility. Digestibility analysis was performed according to the recommended protocol for use in the determination of metabolizable energy of dog food as defined by Method 1 of the Association of American Feed Control Officials (AAFCO). The digestibility analysis results were as follows:

| Nutrient | % Digestibility | Standard Error of Mean |
|---|---|---|
| Dry Matter (Total Food) | 90.1 | ±1.21 |
| Protein | 91.6 | ±0.80 |
| Fat | 95.7 | ±0.52 |
| Energy (Calories) | 93.1 | ±0.78 |

For those skilled in the art, formulations could be developed using different protein sources or therapeutic benefits. Some examples of additional formulations include and are not limited to Tables 3, 4 and 5 below:

TABLE 3

Formula Example (Beef & Chicken)

| Ingredient | % Inclusion |
|---|---|
| Beef | 32.1 |
| Chicken | 27.0 |
| Beef Liver | 19.7 |
| Chicken Liver | 5.0 |
| Chickpeas | 5.0 |
| Sweet Potato | 4.1 |
| Flaxseed | 3.0 |
| Coconut Oil | 2.5 |
| Bone Meal | 0.9 |
| Salt | 0.4 |
| Vit/Min Mix* | 0.2 |
| Tocopherols∓ | 0.1 |

*Proprietary Vegetable & Fruit Blend
∓Natural Antioxidant

TABLE 4

Formula Example (Turkey and Duck)

| Ingredient | % Inclusion |
|---|---|
| Turkey | 47.1 |
| Duck | 19.7 |
| Turkey Liver | 17.0 |
| Chickpeas | 5.0 |
| Sweet Potato | 4.1 |
| Flaxseed | 3.0 |
| Coconut Oil | 2.5 |
| Bone Meal | 0.9 |
| Salt | 0.4 |
| Vit/Min Mix* | 0.2 |
| Tocopherols ∓ | 0.1 |

*Proprietary Vegetable & Fruit Blend
∓Natural Antioxidant

TABLE 5

Formula Example (Beef and Chicken with Gut Health Benefits)

| Ingredient | % Inclusion |
|---|---|
| Beef | 32.1 |
| Chicken | 27.0 |
| Beef Liver | 19.7 |
| Chicken Liver | 5.0 |
| Pumpkin | 5.0 |
| Sweet Potato | 3.5 |
| Chicory Root | 0.5 |
| Flaxseed | 3.0 |
| Coconut Oil | 2.5 |
| Bone Meal | 0.9 |
| Salt | 0.4 |
| Vit/Min Mix* | 0.2 |
| Probiotics | 0.1 |
| Tocopherols ∓ | 0.1 |

*Proprietary Vegetable & Fruit Blend
∓Natural Antioxidant

The invention claimed is:
1. A nutritional bar for animals comprising:
   a. greater than 30 wt. % crude protein;
   b. approximately 30-40 wt. % crude fat;
   c. greater than 0 wt. % carbohydrate, but less than 20 wt. % carbohydrate; and d. greater than 0 wt. % moisture, but less than 10 wt. % moisture;

wherein the bar is shelf-stable, freeze dried, not heat-extruded, has a caloric density of at least 5,000 kcal/kg, contains no artificial ingredients, and is 100% nutritionally complete for a dog.

2. The nutritional bar in claim 1 wherein the bar contains no processing aids, no heat stable sources of vitamins, and supplies vitamins or minerals via fruits and vegetables.

3. The nutritional bar in claim 1 wherein the bar is semi-fractural.

4. The nutritional bar in claim 1 wherein the dog weighs up to approximately 40 lbs.

5. The nutritional bar in claim 4 wherein the bar weighs less than 3 ounces.

6. The nutritional bar in claim 1 comprised of the following ingredients: Beef; Beef Liver; Sweet Potato; Chickpeas; Flaxseed; Coconut Oil; Sea Salt; Natural Vitamin/Mineral Mix via fruits and vegetables; and Tocopherols.

7. The nutritional bar of claim 6 wherein the bar is comprised of the following:

| Ingredients | Inclusion, % |
|---|---|
| Beef | 47.08 |
| Beef Liver | 34.72 |
| Sweet Potato | 5.00 |
| Chickpeas | 5.00 |
| Flaxseed | 3.00 |
| Coconut Oil | 2.50 |
| Bone Meal | 2.00 |
| Sea Salt | 0.40 |
| Vit/Min Mix | 0.20 |
| Tocopherols | 0.10. |

8. A method of manufacturing the bar of claim 1 wherein the components are formed into a mixture, the mixture is pressed into bars and the bars are freeze dried.

9. The method of claim 8 wherein the bars are between 2-3 ounces, approximately 5 to 6 inches long and approximately 2 to 3 inches wide.

10. The method of claim 8 wherein the bar is produced without the use of flow agents or anti-microbial agents.

11. A method of providing complete daily nutrition to an animal by providing to the animal the nutritional bar in claim 1 wherein the nutritional dosage is titrated based on the weight of the animal.

12. The method of claim 11 wherein an animal weighing 40 lb. receives 1 bar.

13. The nutritional bar of claim 1, wherein the bar is comprised of the following ingredients: Beef; Chicken; Beef Liver; Chicken Liver; Chickpeas; Sweet Potato; Flaxseed; Coconut Oil; Salt; Natural Vitamin/Mineral Mix derived from fruits and vegetables; and Tocopherols.

14. The nutritional bar of claim 1, wherein the bar is comprised of the following: Turkey, Duck; Turkey Liver; Chickpeas; Sweet Potato; Flaxseed; Coconut Oil; Salt; Natural Vitamin/Mineral Mix derived from fruits and vegetables; and Tocopherols.

15. The nutritional bar of claim 1, wherein the bar is comprised of the following: Beef; Chicken; Beef Liver; Chicken Liver; Pumpkin; Sweet Potato; Chicory Root; Flaxseed; Coconut Oil; Salt; Natural Vitamin/Mineral Mix via fruits and vegetables; Probiotics; and Tocopherols.

16. The bar of claim 1 wherein the bar has a caloric density of at least 6,000 kcal/kg.

17. The bar of claim 1 wherein the bar has a caloric density of 6,300 kcal/kg.

* * * * *